United States Patent
Yamazaki et al.

(10) Patent No.: US 8,355,602 B2
(45) Date of Patent: Jan. 15, 2013

(54) IMAGE PROCESSING APPARATUS, IMAGE PROCESSING METHOD AND IMAGE PROCESSING PROGRAM

(75) Inventors: Akio Yamazaki, Shiojiri (JP); Ayako Kobayashi, Okaya (JP)

(73) Assignee: Seiko Epson Corporation, Tokyo (JP)

(*) Notice: Subject to any disclaimer, the term of this patent is extended or adjusted under 35 U.S.C. 154(b) by 518 days.

(21) Appl. No.: 12/545,757

(22) Filed: Aug. 21, 2009

(65) Prior Publication Data

US 2010/0046841 A1  Feb. 25, 2010

(30) Foreign Application Priority Data

Aug. 22, 2008  (JP) ................................. 2008-214644

(51) Int. Cl.
*G06K 9/32* (2006.01)
(52) U.S. Cl. ................ 382/298; 382/118; 382/173
(58) Field of Classification Search .................. None
See application file for complete search history.

(56) References Cited

U.S. PATENT DOCUMENTS

| 7,756,302 B2* | 7/2010 | Matsuzaka et al. | 382/118 |
| 2008/0080744 A1* | 4/2008 | Tanaka | 382/118 |
| 2008/0284901 A1* | 11/2008 | Misawa | 348/349 |

FOREIGN PATENT DOCUMENTS

| JP | 09-106453 A | 4/1997 |
| JP | 2004-318204 A | 11/2004 |
| JP | 2006-293782 A | 10/2006 |
| JP | 2007-213623 A | 8/2007 |
| JP | 2008-186247 A | 8/2008 |

* cited by examiner

*Primary Examiner* — Chan S Park
*Assistant Examiner* — David Perlman
(74) *Attorney, Agent, or Firm* — Kilpatrick Townsend & Stockton LLP

(57) ABSTRACT

An image processing apparatus includes a face direction estimating unit that estimates the direction and the degree of turn of a face with the front direction of the face included in a face image used as a reference for a target image that includes the face image, and an area setting unit that changes a first area based on the direction and the degree of turn of the face and sets a correction target area with the changed first area used as a reference when an area that includes the first area is set as the correction target area with the first area that includes predetermined facial organs of the face image used as a reference.

7 Claims, 15 Drawing Sheets

FIG. 8A
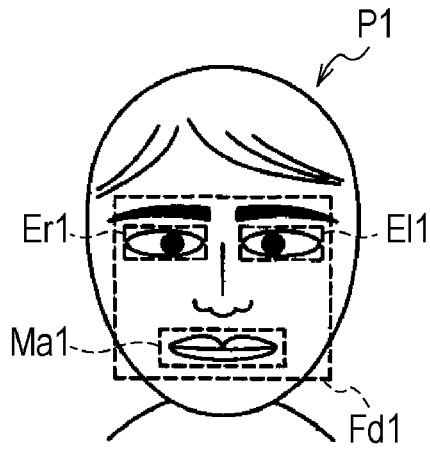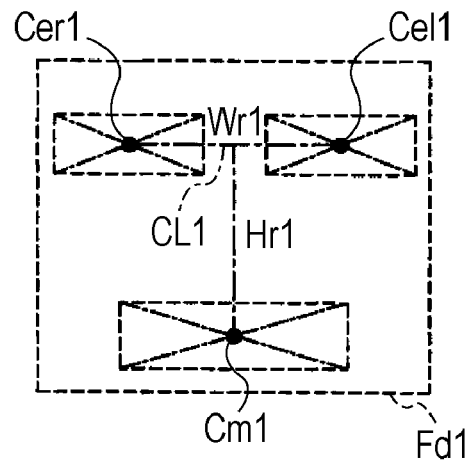
$T1 \leq DI (= Hr1/Wr1) < T2$
⇩
FRONT SIDE DIRECTION
FIG. 8B
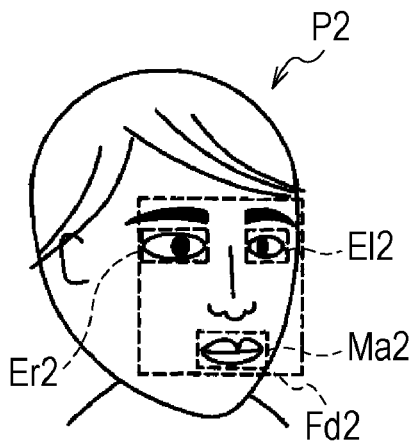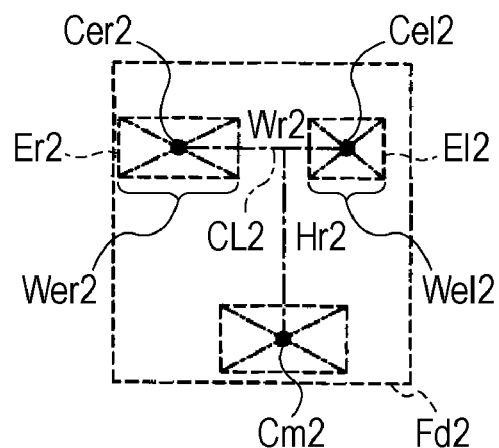
$DI (= Hr2/Wr2) \geq T2$
AND
$Wer2 > Wel2$
⇩
RIGHT-SIDE TURN

|   | H | V |
|---|---|---|
| D11 | 7 | 14 |
| D21 | 7 | 14 |
| D31 | -7 | 14 |
| D41 | -7 | 14 |
| D12 | 7 | 0 |
| D22 | 0 | 0 |
| D32 | 0 | 0 |
| D42 | -7 | 0 |

FIG. 17
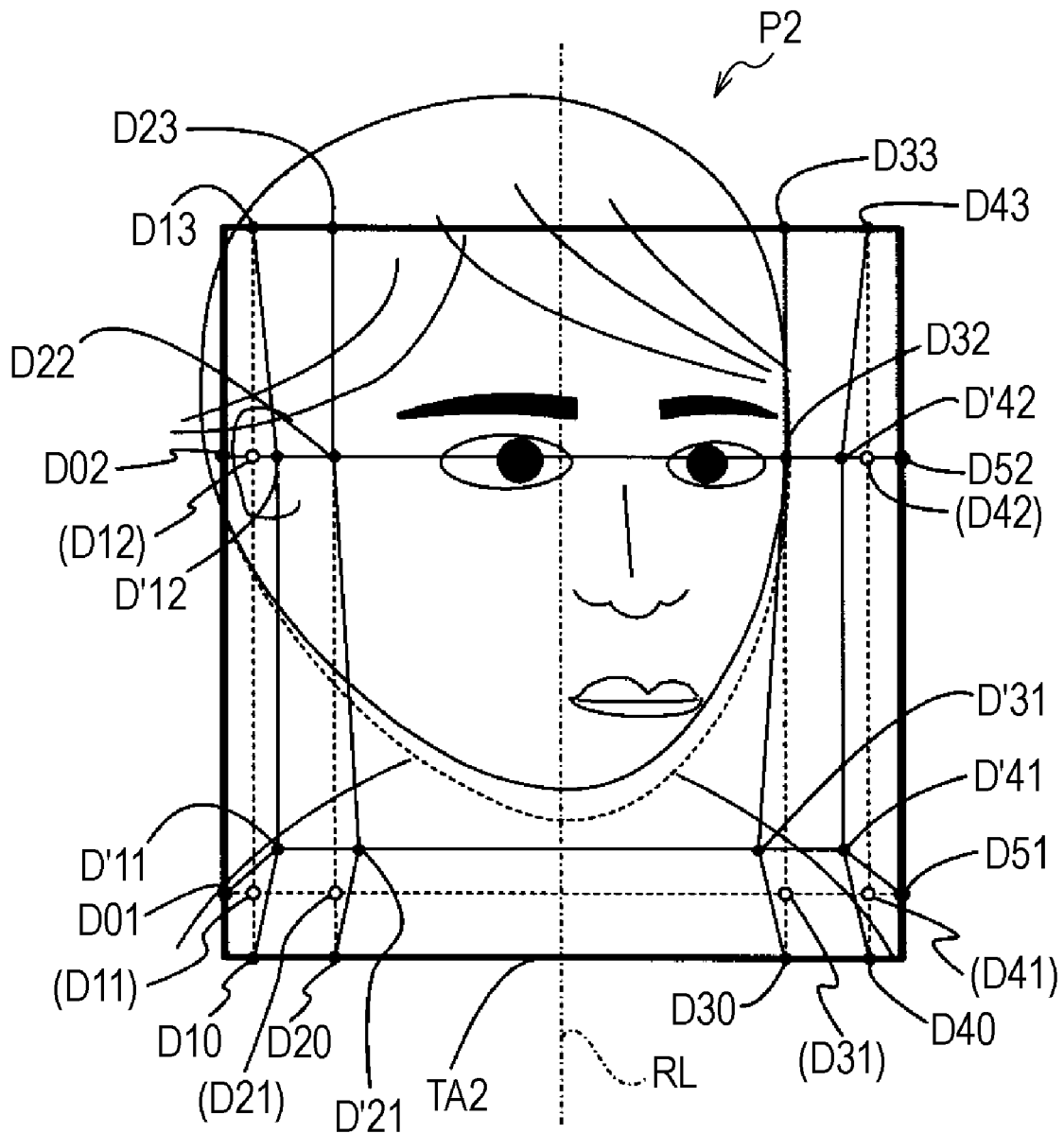
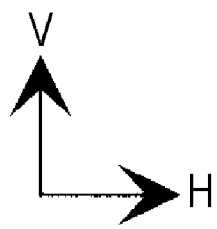

$$\vec{sp} = m1 \cdot \vec{st} + m2 \cdot \vec{su}$$

$$\vec{s'p'} = m1 \cdot \vec{s't'} + m2 \cdot \vec{s'u'}$$

IMAGE PROCESSING APPARATUS, IMAGE PROCESSING METHOD AND IMAGE PROCESSING PROGRAM

Priority is claimed under 35 U.S.C. §119 to Japanese Application No. 2008-214644 filed on Aug. 22, 2008, which is hereby incorporated by reference in its entirety.

BACKGROUND

1. Technical Field

The present invention relates to an image processing apparatus, an image processing method, and an image processing program.

2. Related Art

Image processing technology for modifying a digital image has been known (see JP-A-2004-318204). In JP-A-2004-318204, an image process that modifies the shape of a face by setting a partial area of a face image (an area representing a chin) as a correction area, dividing the correction area into a plurality of small areas along a predetermined pattern, and enlarging or reducing the image with a set magnification ratio for each small area is disclosed.

Typically, it is assumed that such a process is to be used on an image of a front side of a face. Accordingly when the direction of the face that is to be modified is not a frontal view of a face but when a face is turned (i.e. a side view from the left or the right); there is a problem in that the face image after the modification may be unnatural. In particular, when the face is turned, a specific line forming a chin or the like may become an unnatural line in the image after the modification.

SUMMARY

An advantage of some aspects of the invention is that it provides an image processing apparatus, an image processing method, and an image processing program that are capable of performing an optimal process for an image including a face image for acquiring the result of modification of a face image having a good shape even in a case where the face included in the image faces a side other than the front side.

According to the first aspect of the invention, there is provided an image processing apparatus including: a face direction estimating unit that estimates the direction and the degree of turn of a face with the front direction of the face included in the face image used as a reference for a target image that includes the face image; and an area setting unit that changes the first area based on the direction and the degree of turn of the face and sets a correction target area with the changed first area used as a reference when an area that includes the first area is set as the correction target area with the first area that includes predetermined facial organs of the face image used as a reference. According to the above-described image processing apparatus, when setting the correction target area with the first area used as a reference, the area setting unit changes the position or the size of the first area based on the estimated direction of the face and the estimated degree of turn of the face. Accordingly, the correction target area of which the position and the size are optimized for the direction of the face and the degree of turn of the face can be set. When the image modification is performed by using the correction target area set as described above as a target, modification result having a good shape can be acquired even for a face image does not face the front side.

In the above-described image processing apparatus, the area setting unit may be configured to enlarge the first area more toward a side opposite to the direction of the face as the degree of turn of the face is increased. In particular, it may be configured that the face direction estimating unit estimates the degree of turn of the face based on the distance between the facial organs, and the area setting unit determines the degree of enlargement for the first area based on the distance between the facial organs. In such a case, the correction target area can be set to sufficiently include a chin, a cheek, or the like positioned on the opposite side to the direction of the face that is in a state of being turned to the left side or to the right side within the target image. Accordingly, a correction (modification) result that does not cause a feeling of strangeness to a line or an area of a chin, a cheek, or the like can be acquired.

In the above-described image processing apparatus, the area setting unit can be configured to set the correction target area by enlarging the first area, which is used as the reference, with a predetermined enlargement ratio. In such a case, the correction target area is set only by enlarging the first area as a reference with a constant enlargement ratio regardless of the position or the size of the first area that is used as the reference for setting the correction target area, and accordingly, the correction target area can be set in a very easy manner.

In the above-described image processing apparatus, the area setting unit may be configured to acquire an area that includes the facial organs detected by a detection unit, which can detect an area including the facial organs from the target image, as the first area. In such a case, when the degree of turn of the face is larger than a predetermined value, the area setting unit changes the acquired first area based on the direction and the degree of turn of the face, and when the degree of turn of the face is equal to or smaller than the predetermined value, the area setting unit sets the correction target area with the acquired first area used as a reference. In the above-described case, the first area is changed before the correction target area is set only in a case where the degree of turn of the face is larger than the predetermined value.

The above-described image processing apparatus may further include an image correcting unit that modifies an image within the correction target area by disposing a plurality of division points in the set correction target area, dividing the correction target area into a plurality of small areas by using straight lines connecting the division points, and modifying the small areas by moving the position of at least one of the division points. In such a case, the image modification can be performed only by disposing the division points within the correction target area that is set finally and moving the disposed division points. Accordingly, an image modifying process corresponding to various modified shapes can be performed effectively in an easy manner.

Until now, the technical idea relating to the invention has been described as the image processing apparatus. However, an image processing method including processes corresponding to the units that are included in the above-described image processing apparatus or an image processing program that allows a computer to perform the functions corresponding to the units that are included in the above-described image processing apparatus can be perceived as well in the description. In addition, the image processing apparatus, the image processing method, and the image processing program described above may be implemented by hardware such as a personal computer or a server and may be implemented by various products such as a digital still camera or a scanner as an image inputting apparatus or a printer (printing apparatus) as an image outputting apparatus, a projector, or a photo viewer.

BRIEF DESCRIPTION OF THE DRAWINGS

The invention will be described with reference to the accompanying drawings, wherein like numbers reference like elements.

FIGS. 8A and 8B are explanatory diagrams showing an example of the result estimated to be the front direction in estimation of the direction of a face and an example of the result estimated to be the right-side turn in estimation of the direction of a face according to an embodiment of the invention.

FIG. 17 is an explanatory diagram showing a detailed modified shape of the modification area for a face image for the direction turned to the right side according to an embodiment of the invention.

DESCRIPTION OF EXEMPLARY EMBODIMENTS

Hereinafter, embodiments of the invention will be described in the following order.

Figure 1:
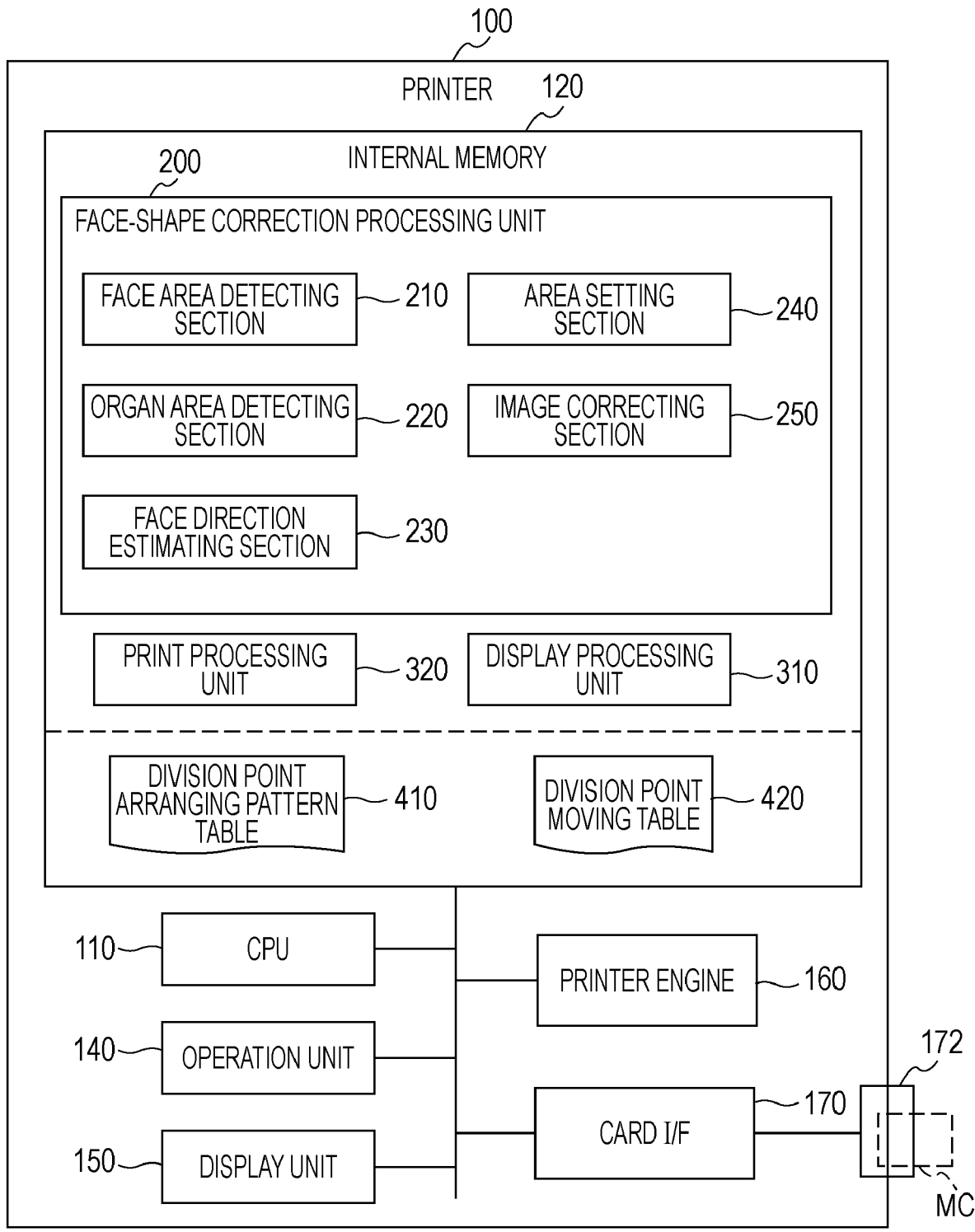
FIG. 1 is an explanatory diagram schematically showing the configuration of a printer according to an embodiment of the invention.

1. Schematic Configuration of Image Processing Apparatus
2. Face Shape Correcting Process
3. Summing Up 1. Schematic Configuration of Image Processing Apparatus FIG. 1 is an explanatory diagram schematically showing the configuration of a printer 100 as an example of an image processing apparatus according to an embodiment of the invention. The printer 100 is a color ink jet printer corresponding to so-called direct printing which prints an image based on image data that is acquired from a recording medium such as a memory card MC. The printer 100 includes an internal memory 120, a CPU 110, an operation unit 140, a display unit 150, a printer engine 160, a card interface (card I/F) 170, and a card slot 172.

The internal memory 120 is configured by a ROM or a RAM. The internal memory 120 includes a face shape correcting process unit 200, a display processing unit 310, a print processing unit 320, a division-point arranging pattern table 410, and a division-point moving table 420. The face shape correcting process unit 200 is a computer program that is used for performing a face shape correcting process to be described later under a predetermined operating system. The face shape correcting process unit 200 includes a face area detecting section 210, an organ area detecting section 220, a face direction estimating section 230, an area setting section 240, and an image correcting section 250 as program modules. The display processing unit 310 is a display driver that displays a processing menu, a message, an image and the like on the display unit 150 by controlling the display unit 150. The print processing unit 320 is a computer program for generating print data that defines the amount of ink for each pixel by performing a predetermined color converting process or a halftone process for the image data and performing printing of an image based on the print data by controlling the printer engine 160. For example, image data that represents an image for which the face shape correcting process has been performed by the face shape correcting process unit 200 corresponds to the image data described here. The CPU 110 implements the functions of these units by reading out the above-described programs from the internal memory 120 and executing the programs.

The operation unit 140 includes buttons or a touch panel. The operation unit 140 receives an input such as a user's direction. The display unit 150, for example, is configured by a liquid crystal display. The printer engine 160 is a printing mechanism that performs a printing operation based on the print data transmitted from the print processing unit 320. The card I/F 170 is an interface that is used for exchanging data with a memory card MC inserted into the card slot 172. The printer 100 may be configured to include an interface other than the card I/F 170 for data communication with other devices (for example, a digital still camera or a personal computer). The above-described constituent elements are interconnected through a bus.

The printer 100 can modify an area including a part of a face image so as to be miniaturized (hereinafter, also referred to as "face miniaturization" or "slimming") by performing the face shape correcting process for an image including the face image. At this moment, even when the direction of the face that is included in the face image is not the front direction, the printer 100 is configured to modify the face image so as to have a good shape.

2. Face Shape Correcting Process

Figure 2:
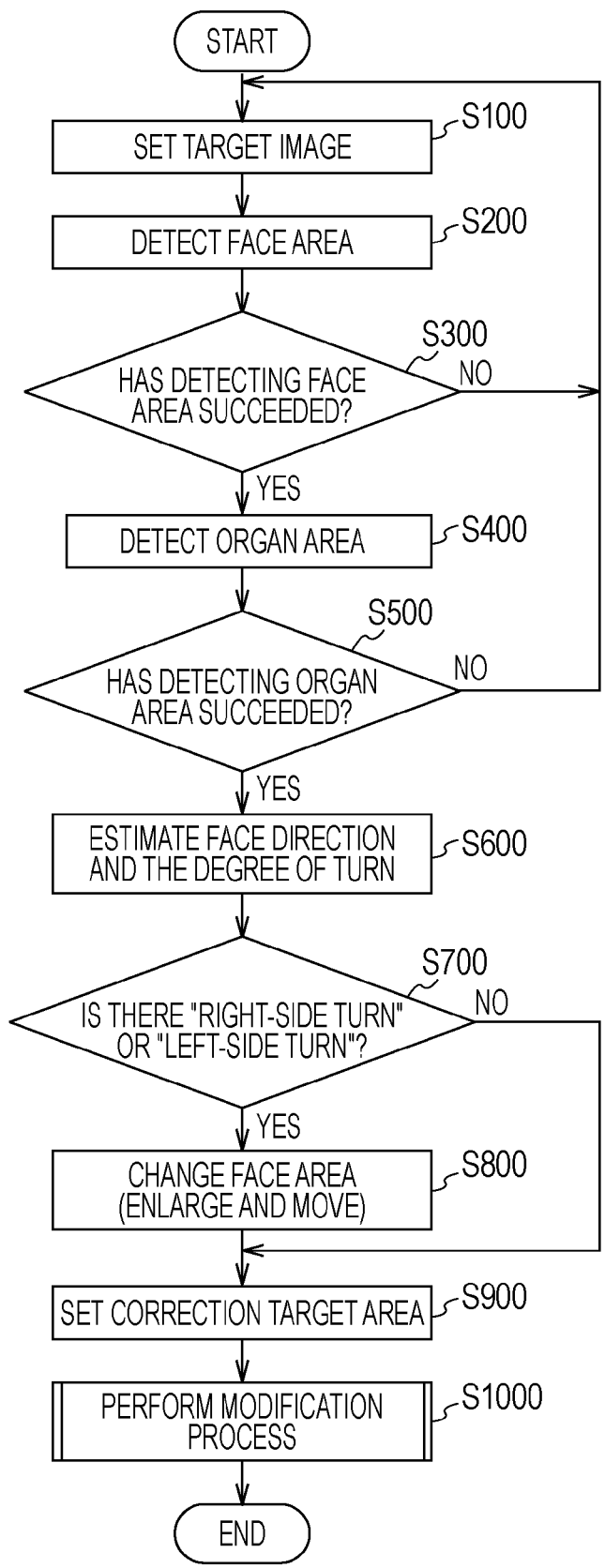
FIG. 2 is a flowchart showing the sequence of a face shape correcting process according to an embodiment of the invention.

FIG. 2 is a flowchart showing the face shape correcting process that is performed by the printer 100. When the memory card MC is inserted into the card slot 172 and a user performs a predetermined operation through the operation unit 140, the face shape correcting process is started.

In Step S100 (hereinafter, notation of Step will be omitted), the face shape correcting process unit 200 sets a target image to be processed. In particular, the face shape correcting process unit 200 directs the display processing unit 310 to display a predetermined user interface (UI) for setting a target image in the display unit 150. Then, the face shape correcting process unit 200 sets a target image based on the input from the UI.

Figure 3:
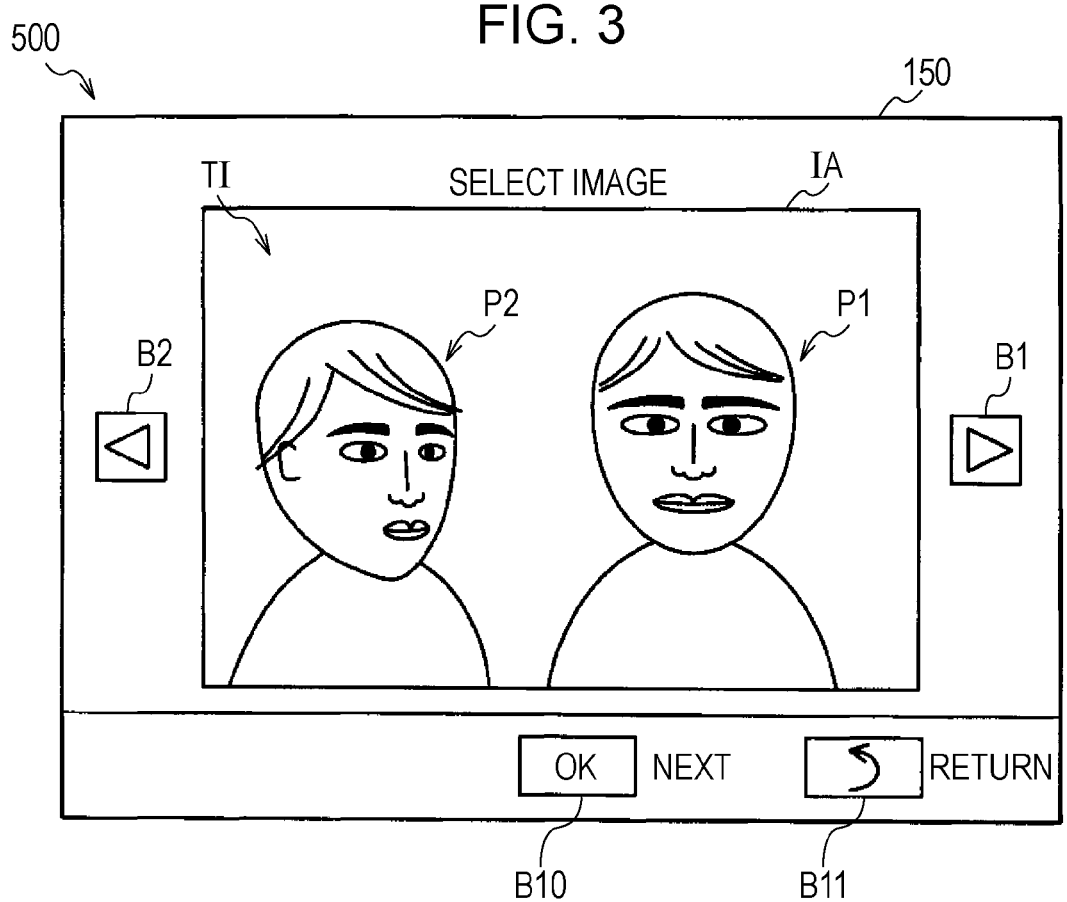
FIG. 3 shows an example of an UI according to an embodiment of the invention.

FIG. 3 shows an example of the UI 500 that is displayed in the display unit 150 in the process of S100. For example, the UI 500 includes an image display field IA, two image shifting buttons B1 and B2, a determination button B10, and a cancel button B11. A user selects a target image by operating the image shifting buttons B1 and B2 while viewing the UI 500, and presses down the determination button B10, whereby the target image can be set. In the example shown in FIG. 3, an image TI in which two persons P1 and P2 are drawn is selected as the target image. In such a state, by user's pressing down the determination button B10, the face shape correcting process unit 200 sets the image TI as the target image. In the UI 500, a list of a plurality of images included in the memory card MC may be configured to be displayed.

In S200, the face area detecting section 210 detects a face area of the target image. A face area is an image area of the target image and is an area that is assumed to include at least a facial organ (eyes, a nose, or a mouth). The face area detecting section 210 analyzes the target image. When the target image includes a facial organ, the face area detecting section 210 detects a rectangular area that is assumed to include the facial organ as a face area. The detection of a face area, for example, is performed by using a general detection method called a pattern matching method using a template (see JP-A-2006-279460). The face area detecting section 210 may use any technique for the above-described pattern matching as long as it can detect a face area. For example, the face area detecting section 210 may be configured to detect the face area by using a learned neural network that receives various information (for example, luminance information, the amount of the edge, the contrast level, or the like) on an image in units of rectangular areas (detection target areas) that are set within the target image and outputs information indicating whether the detection target area corresponds to a face area. In addition, the face area detecting section 210 may be configured to determine whether each detection target area is a face area by using a support vector machine.

Figure 4:
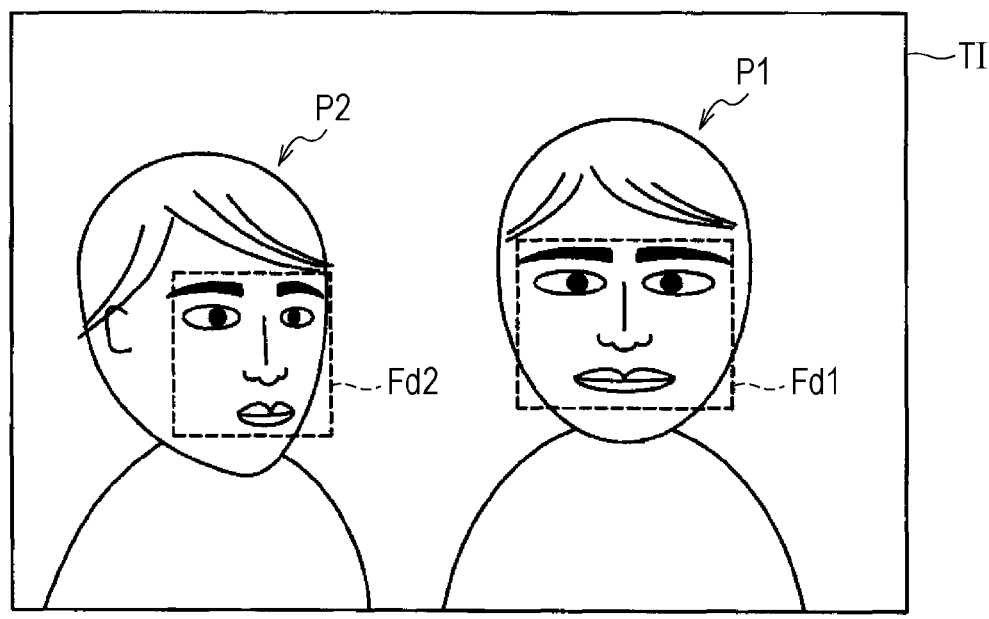
FIG. 4 is an explanatory diagram showing an example of the result of detection of a face area according to an embodiment of the invention.

FIG. 4 is an explanatory diagram showing an example of the result of detection of the face area in S200. In the example shown in FIG. 4, face images of two persons including a person P1 and a person P2 are included in the target image TI. Accordingly, a face area Fd1 corresponding to the face image of the person P1 and a face area Fd2 corresponding to the face image of the person P2 are detected. Each of the face areas Fd1 and Fd2 is a rectangular area that includes all the images of two eyes, a nose, and a mouth. The sizes of the detected face areas Fd1 and Fd2 are different based on the faces of the persons P1 and P2. The face area detecting section 210 specifies each of the two face areas Fd1 and Fd2 by using coordinates of four vertexes of the face area.

When detection of a face area is not successful in Step S200 ("No" in S300), the user is notified with a message indicating no success in the detection through the display unit 150. In such a case, in order to allow the user to select a different image as the target image, the UI 500 is displayed in the display unit 150 again so as to set the target image again (S100). In addition, instead of performing S100 again, it may be configured that the face shape correcting process ends after the message indicating no success in the detection is displayed.

On the other hand, when detection of at least one face area is successful in S200 ("Yes" in S300), the organ area detecting section 220 detects an organ area in the target image TI (S400). The organ area is an image area within the detected face area and represents an area that includes at least an image of a part of a facial organ. According to this embodiment, a right eye, a left eye, and a mouth of a person of a subject are set as the facial organs. Thus, as organ areas, "a right eye area including an image of the right eye", "a left eye area including an image of the left eye", and "a mouth area including an image of the mouth" are detection targets. The organ area detecting section 220 detects a rectangular area assumed to include a right eye as a "right eye area" by analyzing each face area Fd1 or Fd2 that is detected in S200. Similarly, the organ area detecting section 220 detects a rectangular area assumed to include a left eye as a "left eye area" and a rectangular area assumed to include a mouth as a "mouth area" by analyzing each face area Fd1 or Fd2. The detection of an organ area, similarly to the detection of a face area, may be performed, for example, by using a general method called a pattern matching method using a template.

Figure 5:
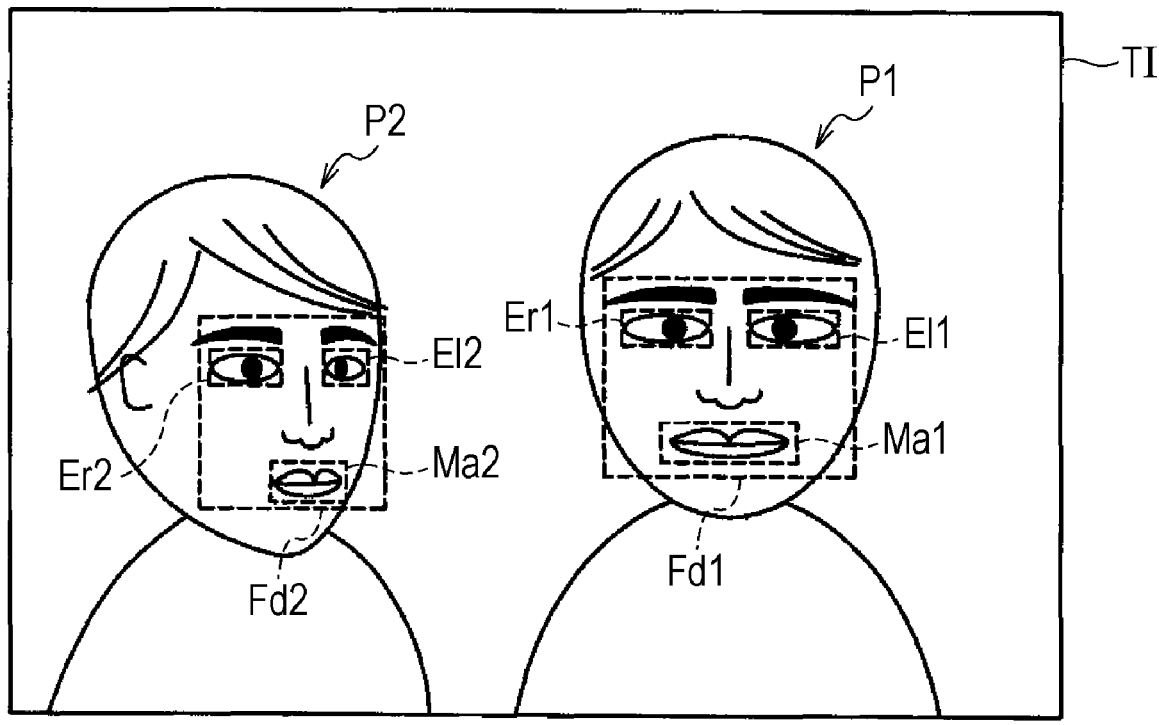
FIG. 5 is an explanatory diagram showing an example of the result of detection of an organ area according to an embodiment of the invention.

FIG. 5 is an explanatory diagram showing an example of the result of detection of an organ area in S400. In the example shown in FIG. 5, a right eye area Er1, a left eye area E11, and a mouth area Ma1 are detected in the face area Fd1 of the person P1. Similarly, a right eye area Er2, a left eye area EL12, and a mouth area Ma2 are detected in the face area Fd2 of the person P2. The organ area detecting section 220 can specify each detected organ area Er1, E11, Ma1, Er2, EL12, or Ma2 by coordinates of four vertexes of the area. In addition, the organ area detecting section 220 may be configured to set a reliability index for each detected organ area additionally. The reliability index is an index that represents a possibility that a detected organ area is truly an area including an image of a facial organ. According to this embodiment, as the reliability index, the number of matches for a case where pattern matching is performed several times with a template changed is used.

In S400, in a case where detection of an organ area is successful ("Yes" in S500), the process proceeds to S600. The case where detection of an organ area is succeeded represents that all the three organ areas of the "right eye area", the "left eye area", and the "mouth area" are detected in a face area. Alternatively, the organ area detecting section 220 may be configured to determine that detection of an organ area is successful for a case where all the three organ areas of the "right eye area", the "left eye area", and the "mouth area" are detected within a face area and the possibility represented by the reliability index is larger than a predetermined threshold value for all the organ areas.

In S600, the face direction estimating section 230 estimates the direction of a face included in the target image TI and the degree of turn of the face and stores the direction of the face and the degree of turn of the face in the internal memory 120. The "direction of a face" according to this embodiment represents the direction of a face by using the front direction (the direction from an observer of the target image TI toward the face of a person as a subject) of the face as a reference. In addition, the "degree of turn of a face" represents an angle (or information that indirectly represents the angle) of the face for a case where the front direction of the face is used as a reference (0o).

Figure 6:
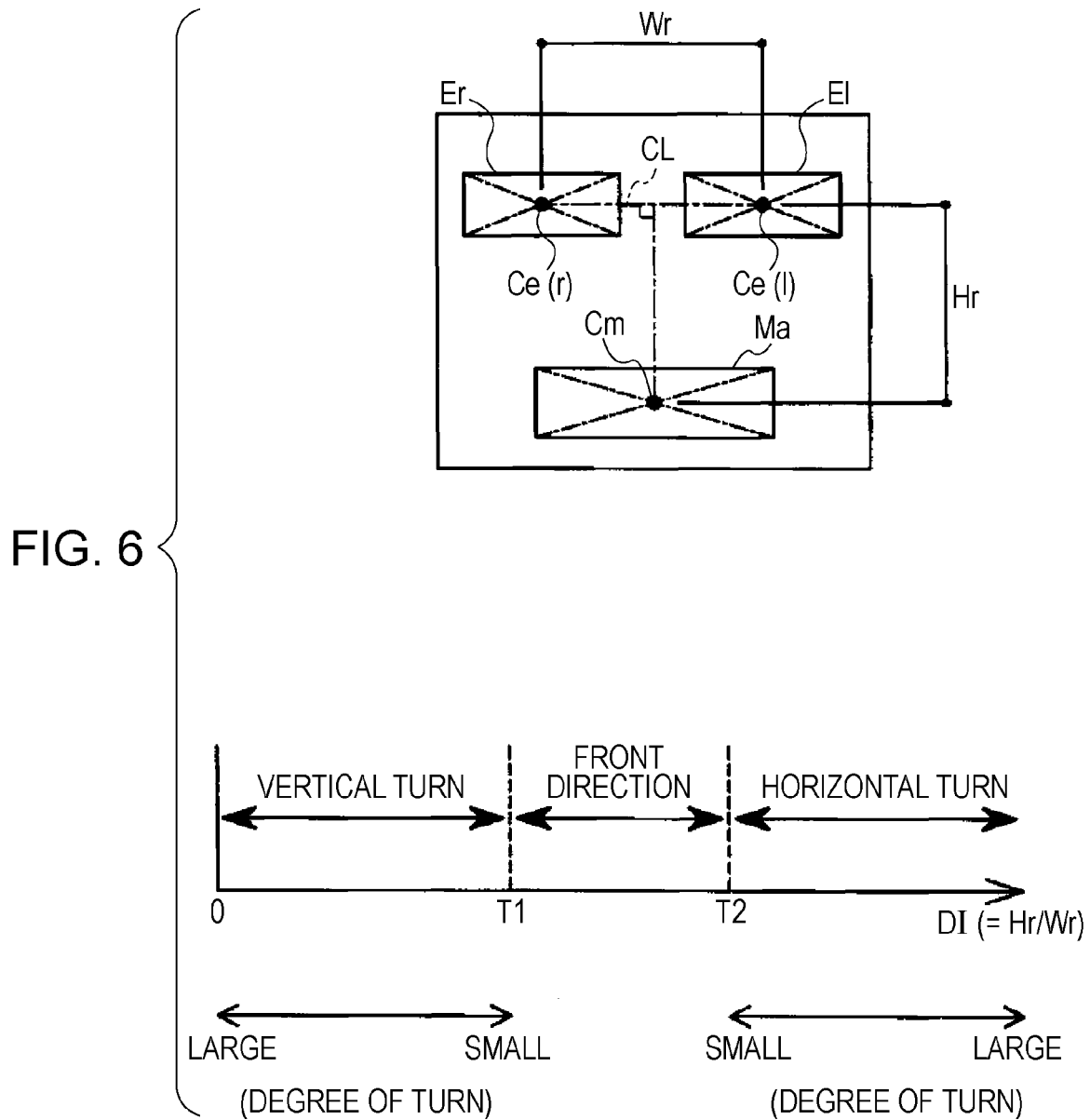
FIG. 6 is an explanatory diagram conceptually showing a method of estimating the direction of a face and the degree of turn of a face according to an embodiment of the invention.

FIG. 6 is an explanatory diagram conceptually showing a method of estimating the direction of a face and the degree of turn of a face in S600. In FIG. 6, the length of a segment CL that connects a center point Ce(r) of the right eye area Er and a center point Ce(l) of the left eye area El is referred to as a reference width Wr, and a distance between a center point Cm of the mouth area Ma and the segment CL is referred to as a reference height Hr. As is apparent from FIG. 6, the reference width Wr is an index relating to the width of a face, and the reference height Hr is an index relating to the height of a face. The face direction estimating section 230 calculates the reference height Hr and the reference width Wr, calculates a ratio (Hr/Wr) of the reference height Hr to the reference width Wr as a determination index DI, and estimate the direction of the face based on the determination index DI. For example, as shown in FIG. 6, when the value of the determination index DI is equal to or larger than a threshold value T1 and smaller than a threshold value T2 (here, threshold value T1<threshold value T2), the face direction estimating section 230 estimates that the direction of the face is the front direction. When the value of the determination index DI is smaller than the threshold value T1, the face direction estimating section 230; estimates that the direction of the face is an upper-side turn or a lower-side turn. On the other hand, when the value of the determination index DI is equal to or larger than the threshold value T2, the face direction estimating section 230; estimates that the direction of the face is a right-side turn or a left-side turn.

The "left-side turn" represents the direction of a face for a case where the face of a person as a subject faces the left side viewed from an observer of the target image TI (that is, the person of the subject actually faces the right side). The "right-side turn" represents the direction of a face for a case where the face of the person faces the right side viewed from the observer of the image (that is, the person actually faces the left side). In addition, the "upper-side turn" represents the direction of a face for a case where the face of a person as a subject faces the upper side viewed from the observer of the image. The "lower-side turn" represents the direction of a face for a case where the face of a person faces the lower side, viewed from the observer of the image. When the direction of a face is the right-side turn or the left side turn, compared to the case of the front direction, the reference height Hr is scarcely changed, but the reference width Wr is decreased. Accordingly, when the direction of the face is the right-side turn or the left-side turn, the value of the determination index DI (=Hr/Wr) is increased, compared to the case of the front direction. When the direction of the face is the upper-side turn or the lower-side turn, the reference width Wr is scarcely changed, but the reference height Hr is decreased, compared to the case of the front direction. Accordingly, when the direction of the face is the upper-side turn or the lower-side turn, the value of the determination index DI (=Hr/Wr) is decreased, compared to the case of the front direction. The threshold value T1 and the threshold value T2 are determined statistically based on the determination indices DI of sample images of a plurality of the faces. The threshold value T1 and the threshold value T2 that are determined in advance, for example, are stored in a predetermined area inside the internal memory 120. The face direction estimating section 230 estimates the direction of a face by using the determination index DI of the target image, the threshold value T1, and the threshold value T2.

In addition, as is apparent from FIG. 6, the determination index DI is a value that represents the degree (angle) of turn of a face with the front direction used as a reference. For example, it can be estimated that, of two face images that are estimated to be right-side turn or the left-side turn, one face of which the value of the determination index DI is larger can be estimated to have the degree (angle) of turn with respect to the front direction larger than the other face (closer to a side face). In addition, determining of the threshold value T1 and the threshold value T2 corresponds setting the degree of turn of a face image with respect to the precise front direction (the state in which the face of the subject and the image pickup device (observer) face each other on the front side) to be estimated as the "front direction".

Figure 7A:
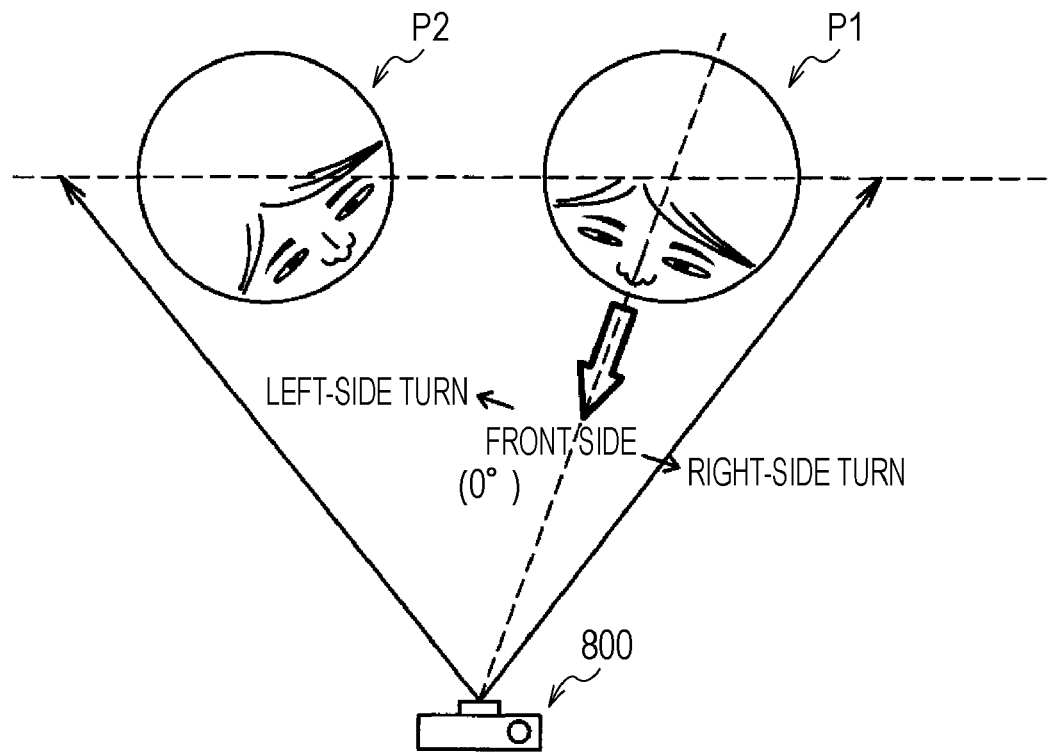
FIGS. 7A and 7B are explanatory diagram showing the positional relationship between a person and an image pickup device according to an embodiment of the invention.

FIG. 7A is an explanatory diagram showing the positional relationship between the person P1 and the image pickup device at a time when the target image TI shown in FIG. 5 is acquired. In the example shown in FIG. 7A, the positional relationship between two persons P1 and P2 and an image pickup device (digital still camera) 800 at the time of photographing, viewed from the upper side is shown. The two persons P1 and P2 are located at an almost same distance from the digital still camera 800. At this moment, the person P1 faces the digital still camera 800 on the front side. Accordingly, as shown in FIG. 5, the direction of the face of the person P1 is the front direction.

Figure 7B:
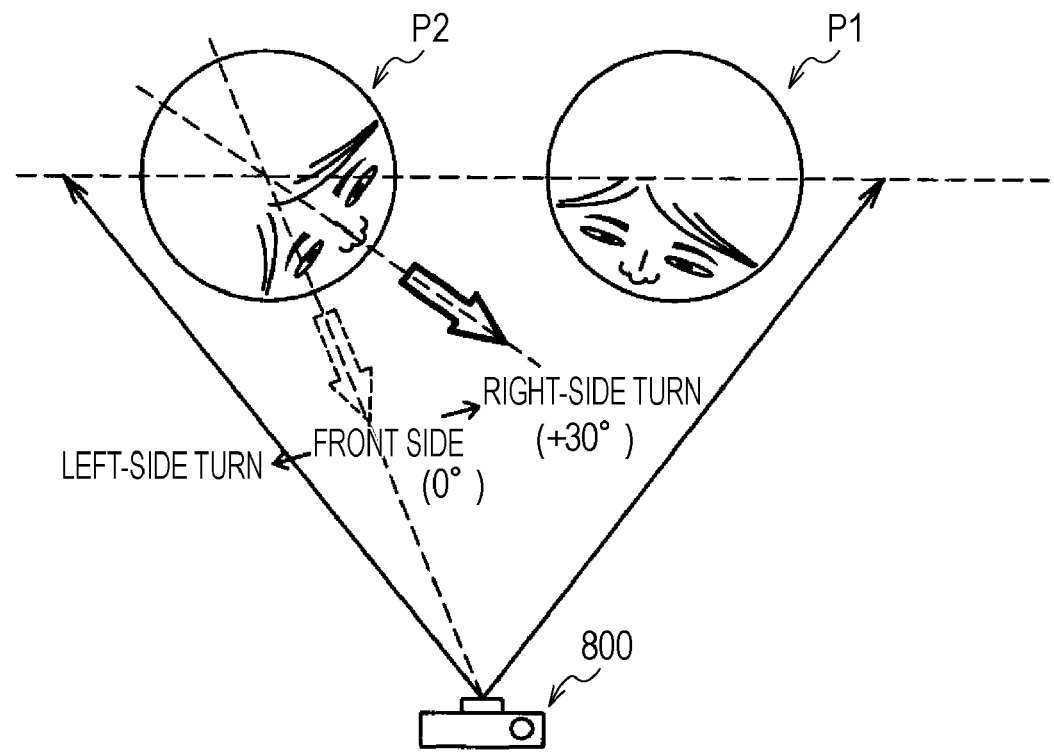

FIG. 7B is an explanatory diagram showing the positional relationship between the person P2 and the image pickup device at the time when the target image TI shown in FIG. 5 is acquired. FIG. 7B, similarly to FIG. 7A, shows the positional relationship between the two persons P1 and P2 and the digital still camera 800 at the time of photographing, viewed from the upper side. The person P2 faces a direction turned to the right side (the right side viewed from the observer) by 30° (+30°) with the direction (the front direction of the face) facing the digital still camera 800 on the front side used as the reference. For the target image TI that is acquired by photographing under the above described positional relationship, the face direction estimating section 230, for example, can estimate the direction of each face and the degree of turn of each face by using the above-described determination index DI as described below.

FIG. 8A is an explanatory diagram showing an example of the result estimated to be the front direction in estimation of the direction of a face. In the example shown in FIG. 8A, as the result of the estimation of the direction of a face for the face image of the person P1, the value of the determination index DI (=Hr1/Wr1) is equal to or larger than the threshold value T1 and smaller than the threshold value T2, and accordingly, the direction of the face is estimated to be the "front direction". In such a case, "front direction" as a value representing the direction of the face and "0°" as a value representing the degree (angle) of turn of the face are stored in the internal memory 120 in association with values (coordinates of vertexes of the rectangle of the face area or the like) representing the face area Fd1. In addition, the angle of turn of the face can be determined by using an angle table (not shown) in which each determination index DI is associated with the angle. This angle table (not shown) is set by acquiring the angle of turn for each determination index DI experimentally in advance and is stored in the internal memory 120 or the like.

FIG. 8B is an explanatory diagram showing an example of the result estimated to be the right-side turn in estimation of the direction of a face. In FIG. 8B, as the result of estimation of the direction of a face for the face image of the person P2, the value of the determination index DI (=Hr2/Wr2) is equal to or larger than the threshold value T2, and accordingly, the direction of the face is estimated to be the "right-side turn" or the "left-side turn". In addition, the face direction estimating section 230 estimates which one of the right-side turn and the left-side turn the direction is. This estimation, for example, can be performed by comparing the width Wer of the right eye area Er and the width We1 of the left eye area E1. In other words, when the width Wer of the right eye area Er is larger, the direction of the face is estimated to be the right-side turn. On the other hand, when the width Wel of the left eye area E1 is larger, the direction of the face is estimated to be the left-side turn. In the example shown in FIG. 8B, since the width Wer2 of the right eye area Er2 is larger than the width We12 of the left eye area EL12, the direction of the face is estimated to be the "right-side turn". In addition, the face direction estimating section 230 can acquire the angle (+30°) of turn of the face image for the person P2 based on the acquired determination index DI by referring to the above-described angle table (not shown). Then, the face direction estimation section 230 stores the "right-side turn" as the value representing the direction of the face and "+30°" as the value representing the degree of turn of the face in the internal memory 120 in association with values representing the face area Fd2. Apparently, it may be configured that the face direction estimating section 230 also stores the determination index DI (=Hr2/Wr2) for the face image of the person P2 other than information of the "right-side turn" and "+30°" in the internal memory 120 in association with the values representing the face area Fd2. Instead of determining the degree (angle) of turn of the face based on the determination index DI, the face direction estimating section 230 may be configured to determine the degree of turn of the face by using a ratio of the width Wer of the right eye area Er to the width Wel of the left eye area E1 and an angle table (not shown) in which each ratio and the angle of turn of the face are associated with each other in advance.

In S700, the area setting section 240 determines whether each face image included within the target image TI is the "right-side turn" or the "left-side turn" by referring to information for each face area Fd1 and Fd2 which is stored in the internal memory 120. This determination is performed for each face area that has been detected. In other words, when the determination target is the face area Fd1 in S700, the face of the face area Fd1 is in the "front direction", and accordingly, the area setting section 240 determines the result to be "No", and the process proceeds to S900 with S800 being skipped. On the other hand, when the determination target is the face area Fd2 in S700, the face of the face area Fd2 is the "right-side turn", and accordingly, the area setting section 240 determines the result to be "Yes", and the process proceeds to S800.

In S900, the area setting section 240 sets a correction target area (hereinafter, also referred to as a modification area) by referring to each face area within the target image TI. The modification area represents an area that can be a target for a modification process performed by the image correcting section 250 to be described later.

According to this embodiment, before the modification area is set by referring to the face areas as described above, the process of S800 is inserted or not inserted based on the degree of turn of the face. In particular, according to this embodiment, when a face image included in the target image TI is the "right-side turn" or the "left-side turn" ("Yes" in S700), in other words, when the determination index DI is equal to or larger than the threshold value T2, modification is performed for the position and the size of the face area based on the direction and the degree of turn of the face in S800 (S800). In such a viewpoint, the face area according to this embodiment corresponds to the first area according to an embodiment of the invention.

Now, the process of S800 will be described for the case of the face area Fd2 as an example.

Figure 9:
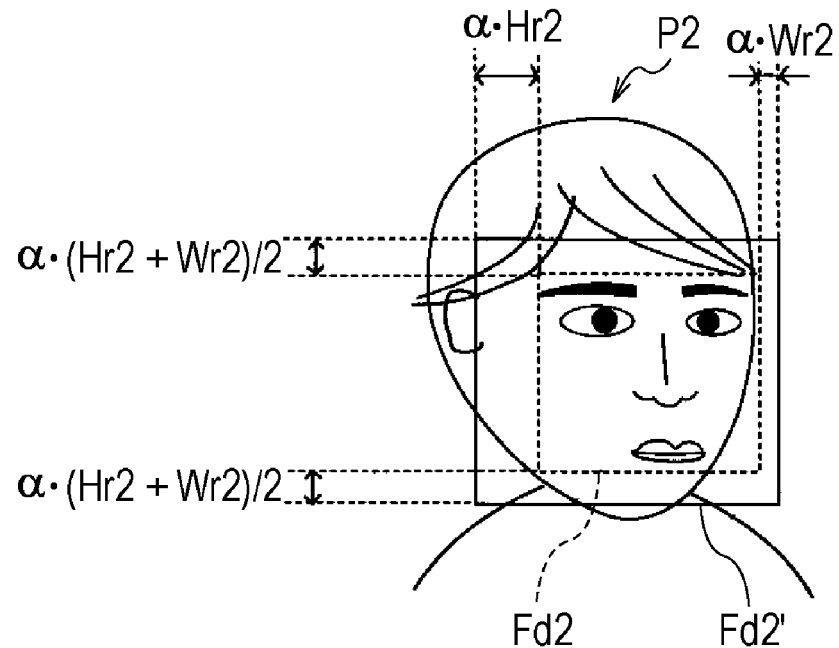
FIG. 9 is a diagram showing an example of turn of a face in which the face area is enlarged based on the direction of a face and the degree of turn of the face according to an embodiment of the invention.

FIG. 9 shows a face area Fd2 (long dotted line) before the process of S800 and a face area Fd2' (solid line) after the process of S800 as an example. FIG. 9 shows a case where the area setting section 240 enlarges the face area Fd2 vertically and horizontally based on the information representing the direction of the face and the degree of turn of the face which is stored in the internal memory 120 in association with the face area Fd2 and sets the area after enlargement as the face area Fd2'. In such a case, the area setting section 240 enlarges the face area Fd2 such that the amount of enlargement toward a side (left side) opposite to the direction (the right-side turn) of the face corresponding to the face area Fd2 is increased as the degree (angle) of the right-side turn or the left-side turn of the face corresponding to the face area Fd2 is increased.

In particular, when enlarging the face area Fd2 by moving the left and right sides facing the height direction of the face (an approximately vertical direction of the face) to the outer side in the width direction of the face (an approximately horizontal direction of the face), the area setting section 240 enlarges the face area Fd2 such that a ratio of the enlargement amount of the side (the right side in FIG. 9) that the face faces to the enlargement amount of the side (the left side) opposite to the side the face faces is the same as a ratio of the reference width Wr2 of the face area Fd2 to the reference height Hr2. In addition, the area setting section 240 enlarges the face area Fd2 by moving the upper and lower sides facing the width direction of the face to the outer sides in the height direction of the face by a same amount. In the example shown in FIG. 9, a case where the face area Fd2' is set by enlarging the side (the right side) that the face faces by $\alpha \cdot Wr2$ and a side (the left side) opposite to the side that the face faces by $\alpha \cdot Hr2$ for the width direction of the face and enlarging the upper and lower sides by $\alpha \cdot (Hr2+Wr2)/2$ respectively for the height direction of the face is shown. Here, $\alpha$ is a coefficient for normalizing Hr2 and Wr2 to the enlargement amount of the face area Fd2. The value of $\alpha$ is determined based on the size of the face area Fd2, Hr2, and Wr2.

Figure 10:
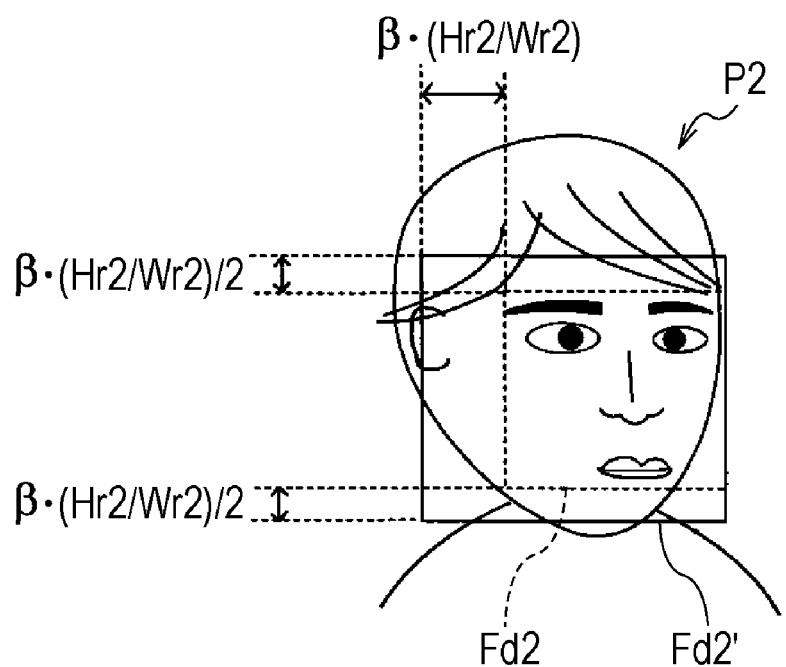
FIG. 10 is a diagram showing an example of turn of a face in which the face area is enlarged based on the direction of a face and the degree of turn of the face according to an embodiment of the invention.

FIG. 10 shows a case where the face area is enlarged from the face area Fd2 (a long dotted line) before the process of S800 to the face area Fd2' (a solid line) after the process of S800 by using a technique different from that described with reference to FIG. 9, as an example. Also in FIG. 10, the area setting section 240 enlarges the face area Fd2 based on the information representing the direction of the face and the degree of turn of the face that are stored in the internal memory 120 in association with the face area Fd2 and sets the area after enlargement as the face area Fd2'. Also in such a case, the area setting section 240 enlarges the face area Fd2 such that the enlargement amount to a side (the left side) opposite to the direction of the face (turned to the right side) corresponding to the face area Fd2 is increased as the degree (angle) of turn of the face to the right side or the left side corresponding to the face area Fd2 is increased. However, in the example shown in FIG. 10, differently from the example shown in FIG. 9, the position of the side (right side), that the face faces, of the upper, the lower, the left, and the right sides of the face area Fd2 is fixed.

In particular, in the example shown in FIG. 10, the area setting section 240 sets the face area Fd2' by enlarging the side opposite to the side (right side) that the face faces by $\beta \cdot (Hr2/Wr2)$ for a case where the face area Fd2 is enlarged in the width direction of the face and respectively enlarging the upper and lower sides by $\beta \cdot (Hr2/Wr2)/2$ for a case where the face area Fd2 is enlarged in the height direction. Here, $\beta$ is a coefficient for normalizing Hr2/Wr2 to the enlargement amount of the face area Fd2. The value of $\beta$ is determined based on the size of the face area Fd2 and the like.

As described above, when the area setting section 240 sets the face area Fd2' in S800 by using one technique described with reference to FIG. 9 or 10, the process of S900 is performed with the set face area Fd2' used as a reference. For the face area for which the process of S800 is not performed, the area setting section 240 performs the process of S900 with the face area used as a reference.

In S900, the area setting section 240 sets a modification area by enlarging the face area with a magnification factor determined in advance for each face area that is used as the reference. In other words, the position and the size of the modification area are determined based on the position and the size of the face area that is used as the reference.

Figure 11:
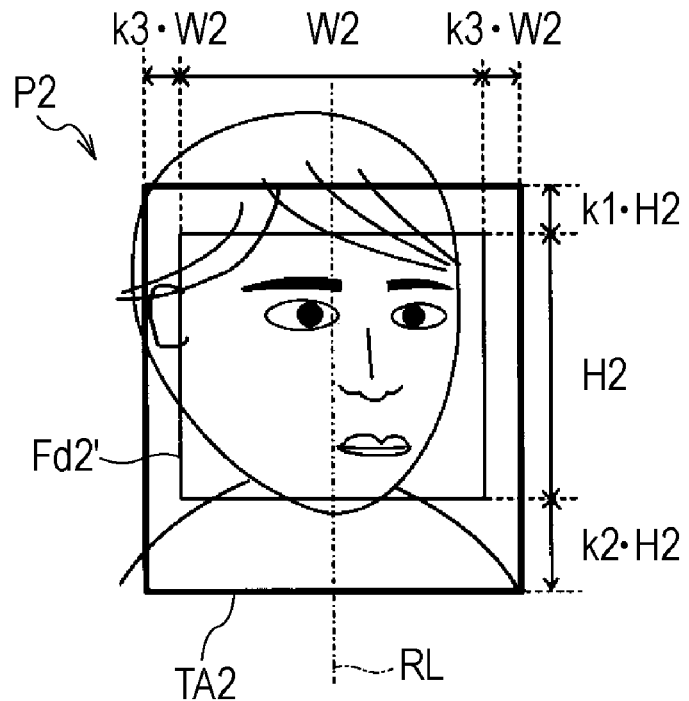
FIG. 11 is an explanatory diagram showing an example of a method of setting a modification area according to an embodiment of the invention.

FIG. 11 is an explanatory diagram showing an example of a method of setting the modification area in S900. In the example shown in FIG. 11, the appearance of setting a modification area TA2 (thick solid line) with the face area Fd2' shown in FIG. 9 used as the reference is shown. A reference line RL is a straight line that defines the height direction of the face area Fd2' and represents the center of the face area Fd2' in the width direction. In other words, the reference line RL is a straight line that passes through the center of the rectangular face area Fd2' and is parallel to a boundary line along the height direction of the face area Fd2'. As shown in FIG. 11, according to this embodiment, the modification area TA2 is set as an area acquired by enlarging the face area Fd2' in the direction (the height direction) parallel to the reference line RL and the direction (the width direction) that is perpendicular to the reference line RL.

In particular, when the length of the face area Fd2' in the height direction is denoted by H2, and the length of the face area Fd2' in the width direction is denoted by W2, an area acquired by enlarging the face area Fd2' to the upper side by $k1 \cdot H2$ and to the lower side by $k2 \cdot H2$ and respectively enlarging the face area Fd2' to the left and right sides by $k3 \cdot W2$ is set as the modification area TA2. Here, k1, k2, and k3 are coefficients that are determined in advance for setting the modification area by enlarging the face area. Even when the face area that becomes the reference for setting the modification area is the above-described face area Fd1 or the like in S900, the coefficients k1, k2, and k3 that are used for enlarging the area are not changed. When the modification area TA2 is set as described above, the reference line RL becomes the straight line that is also parallel to the contour of the modification area TA2 in the height direction. In addition, the reference line RL becomes a straight line that divides the width of the modification area TA2 in half. When the area setting section 240 sets the modification area, the image correcting section 250 performs a modification process for each of the set modification areas in S1000.

Figure 12:
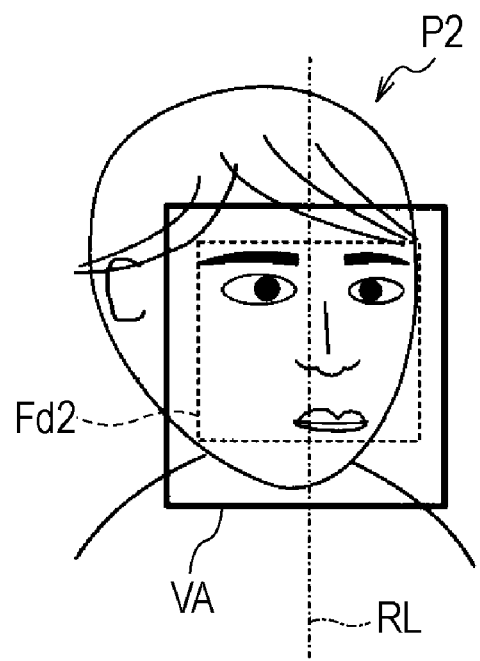
FIG. 12 is a diagram showing the turn of a face for a case where the modification area is set with a face area, which is not enlarged based on the direction of the face and the degree of turn of the face, used as a reference.

FIG. 12 is a comparative example for FIG. 11. FIG. 12 shows a case where the process of S900 is performed for the face area Fd2 of the person P2 not through the process of S800, that is, a case where a modification area VA (thick solid line) is set by enlarging the face area Fd2 as the reference by using the above-described coefficients k1, k1, and k3. As is apparent by comparing FIG. 12 with FIG. 11, the modification area TA2 that is set with the face area Fd2' used as the reference is larger than the modification area VA that is set with the face area Fd2 used as the reference and is moved in a position in which almost all the areas (when the face direction is the "the right side turn", areas of a cheek, a chin, a jaw, and the like on the left side (the left side viewed from the observer of the target image TI) of the face) on the side opposite to the face direction are included and an area below the chin is included sufficiently.

The modification area that becomes the target for the modification process of this embodiment is preferably set so as to mostly include an image from a position in the middle of the neck below the chin up to the forehead for the height direction and images of the left and right cheeks for the width direction. Accordingly, the above-described coefficients k1, k2, and k3 are acquired and set experimentally in advance so as to acquire the modification area that includes images of the above-described range on the whole. However, settings of these coefficients k1, k2, and k3 are optimized on the premise of the face image for the front-side direction. When the face area is detected from the face image for the front direction and the face image for the direction turned to the right side (or for the direction turned to the left side), although also depending on the technique for detecting the face area, generally a face area detected from the face image for the direction turned to the right side (or for the direction turned to the left side) tends to have a rectangle smaller than that detected from the face image for the front direction. Accordingly, as shown in FIG. 12, when the modification area is set by directly applying the above-described coefficients k1, k2, and k3 to the face area detected from the face image for the direction turned to the right side (or the direction turned to the left side), the modification area becomes small.

In other words, when setting of the modification area is performed in S900 for a face area of the face image having the degree of the face turned to the right side or the left side larger than the predetermined value without the process of S800 being intervened, the acquired modification area becomes a small rectangle that does not include the area of the face positioned on a side opposite to the face direction sufficiently. According to this embodiment, in order to prevent a disadvantage (the content of the disadvantage will be described later) due to a decrease of the modification area set for the face image having the degree of turn of the face larger than the predetermined value, the above-described processes of S700 and S800 are performed before S900.

Figure 13:
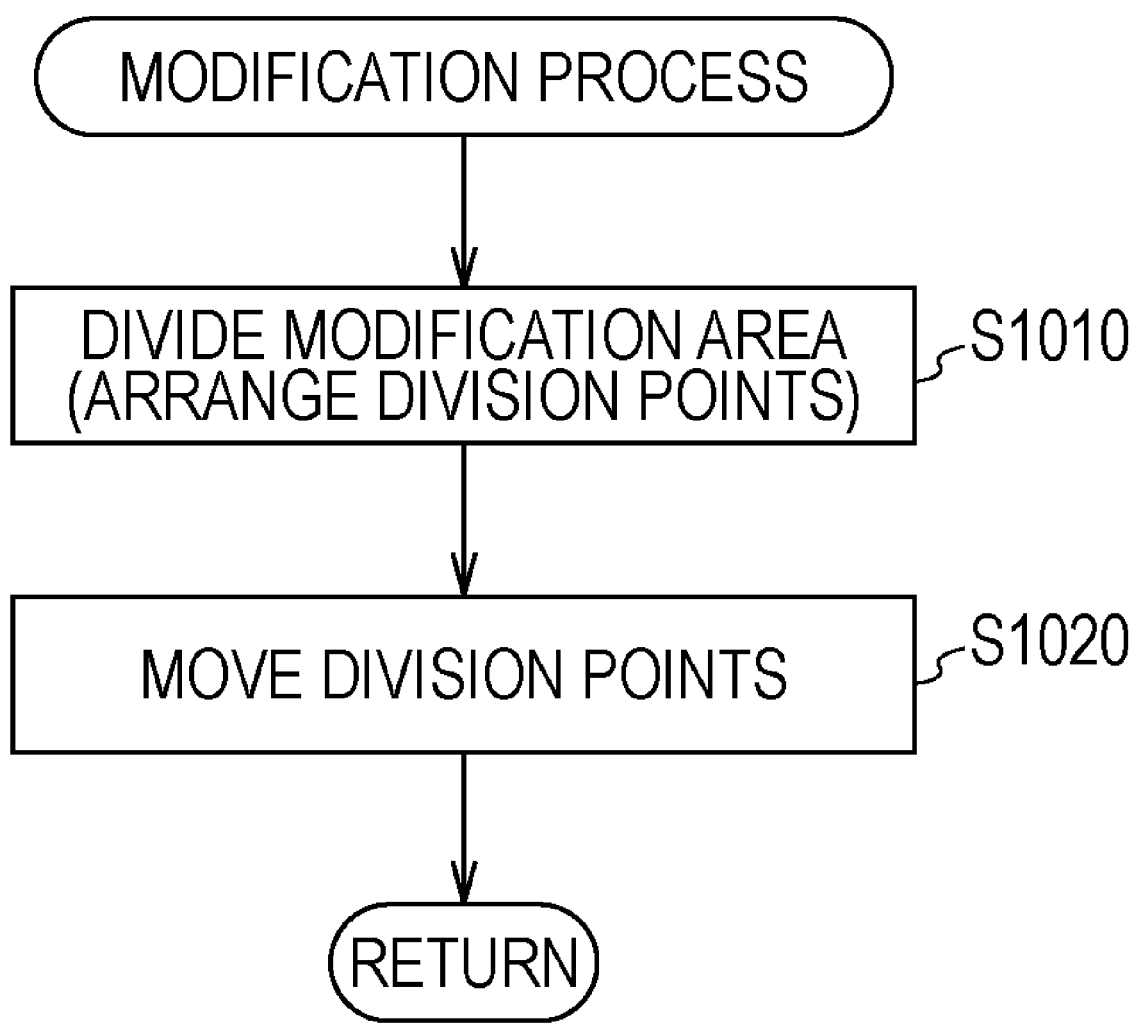
FIG. 13 is a flowchart showing a detailed sequence of a modification process according to an embodiment of the invention.

FIG. 13 is a flowchart showing the content of the modification process of S1000.

In S1010, the image correcting section 250 divides the modification area that is set in S900 into a plurality of small areas.

Figures 14, 15:
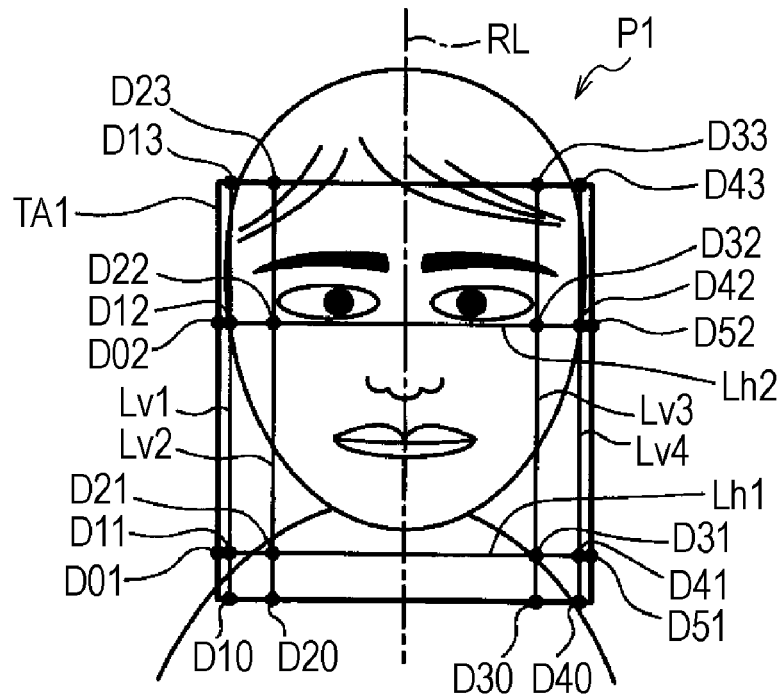
FIG. 14 is an explanatory diagram showing an example of a method of dividing the modification area into a plurality of small areas according to an embodiment of the invention.
FIG. 15 is an explanatory diagram showing an example of a division point moving table according to an embodiment of the invention.

FIG. 14 is an explanatory diagram showing an example of a method of dividing the modification area into a plurality of small areas. In FIG. 14, a modification area TA1 that is set with the face area Fd1 of the person P1 used as the reference is shown. The image correcting section 250 disposes a plurality of division points D in the modification area TA1 and divides the modification area TA1 into small areas by using the straight line that connects the division points D.

The form of disposition of the division points D (the number and the position of the division points D) is defined by a division point disposing pattern table 410. The image correcting section 250 disposes the division points D by referring to the division point disposing pattern table 410. In the face image correcting process of this embodiment, a face-miniaturization process for slimming the shape of the face is performed. In the division point disposing pattern table 410, the disposition pattern of the division points D is defined in advance in a form corresponding to such face-miniaturization.

In the example shown in FIG. 14, the division points D are disposed in intersections of horizontal division lines Lh and vertical division lines Lv and intersections of the horizontal division lines Lh, the vertical division lines Lv, and an outer line of the modification area TA1. The horizontal division lines Lh and the vertical division lines Lv are lines that become the reference for disposing the division points D within the modification area TA1. As shown in FIG. 14, in disposition of the division points D according to this embodiment, two horizontal division lines Lh that are perpendicular to the reference line RL and four vertical division lines Lv that are parallel to the reference line RL are set. Here, the two horizontal division lines Lh are referred to as Lh1 and Lh2 in the order from the lower side of the modification area TA1. In addition, the four vertical division lines LV are referred to as Lv1, Lv2, Lv3, and Lv4 in the order from the left side of the modification area TA1.

The horizontal division line Lh1 is disposed on the lower side of the image of the chin in the modification area TA1, and the horizontal division line Lh2 is disposed near the lower side of the eye image. In addition, the vertical division lines Lv1 and Lv4 are disposed on the outer side of the image of the line of the cheek (cheek bone), and the vertical division lines Lv2 and Lv3 are disposed on the outer side of the image of the tail of the eye. The disposition of the horizontal division lines Lh and the vertical division lines Lv are set based on the correspondence relationship with the size of the modification area TA1 set in advance such that the positional relationship between the horizontal division lines Lh, the vertical division lines Lv, and the image becomes the above-described positional relationship as a result.

In accordance with the above-described disposition of the horizontal division lines Lh and the vertical division lines Lv, the division points D are disposed in the intersections of the horizontal division lines Lh and the vertical division lines Lv and the intersections of the horizontal division lines Lh, the vertical division lines Lv, and the outer line of the modification area TA1. As shown in FIG. 14, the division points D located on the horizontal division line Lhi (here, i=1 or 2) are referred to as D0$i$, D1$i$, D2$i$, D3$i$, D4$i$, and D5$i$ in the order from the left side. For example, the division points D located on the horizontal division line Lh1 are referred to as D01, D11, D21, D31, D41, and D51. Similarly, the division points D located on the vertical division line Lvj (here, j=any one of 1, 2, 3, and 4) are referred to as Dj0, Dj1, Dj2, and Dj3 in the order from the lower side. For example, the division points D located on the vertical division line Lv1 are referred to as D10, D11, D12, and D13. In addition, as shown in FIG. 14, the disposition of the division points D is formed to be symmetrical with respect to the reference line RL.

The image correcting section 250 divides the modification area TA1 into small areas by using straight lines (that is, the horizontal division lines Lh and the vertical division lines Lv) that connect the disposed division points D. In the example shown in FIG. 14, the modification area TA1 is divided into 15 small rectangular areas.

In S1020, the image correcting section 250 modifies the modification area TA1 by modifying the small areas by moving the positions of the division points D in accordance with the division point moving table 420 that is stored in the internal memory 120.

FIG. 15 shows an example of the division point moving table 420. In the division point moving table 420, the amounts of movement for the division points D11 to D42 disposed in S1010 are set for the direction perpendicular to the reference line RL (referred to as direction H) and the direction parallel to the reference line RL (referred to as direction V). According to this embodiment, the unit of the amount of movement is the pixel pitch PP of the target image TI. In addition, for the direction H, the amount of movement to the right side from the view of the observer is denoted by a positive value, and the amount of movement to the left side from the view of the observer is denoted by a negative value. In addition, for the direction V, the amount of movement to the upper side is denoted by a positive value, and the amount of movement to the lower side is denoted by a negative value. In the example shown in FIG. 15, for the division point D11 in the division point moving table 420, an amount of movement corresponding to a distance of seven times the pixel pitch PP to the right side along the direction H is set, and an amount of movement corresponding to a distance of 14 times the pixel pitch PP to the upper side along the direction V is set. In addition, for the division point D22, zero is set as the amount of movement for both the direction H and the direction V.

Figure 16:
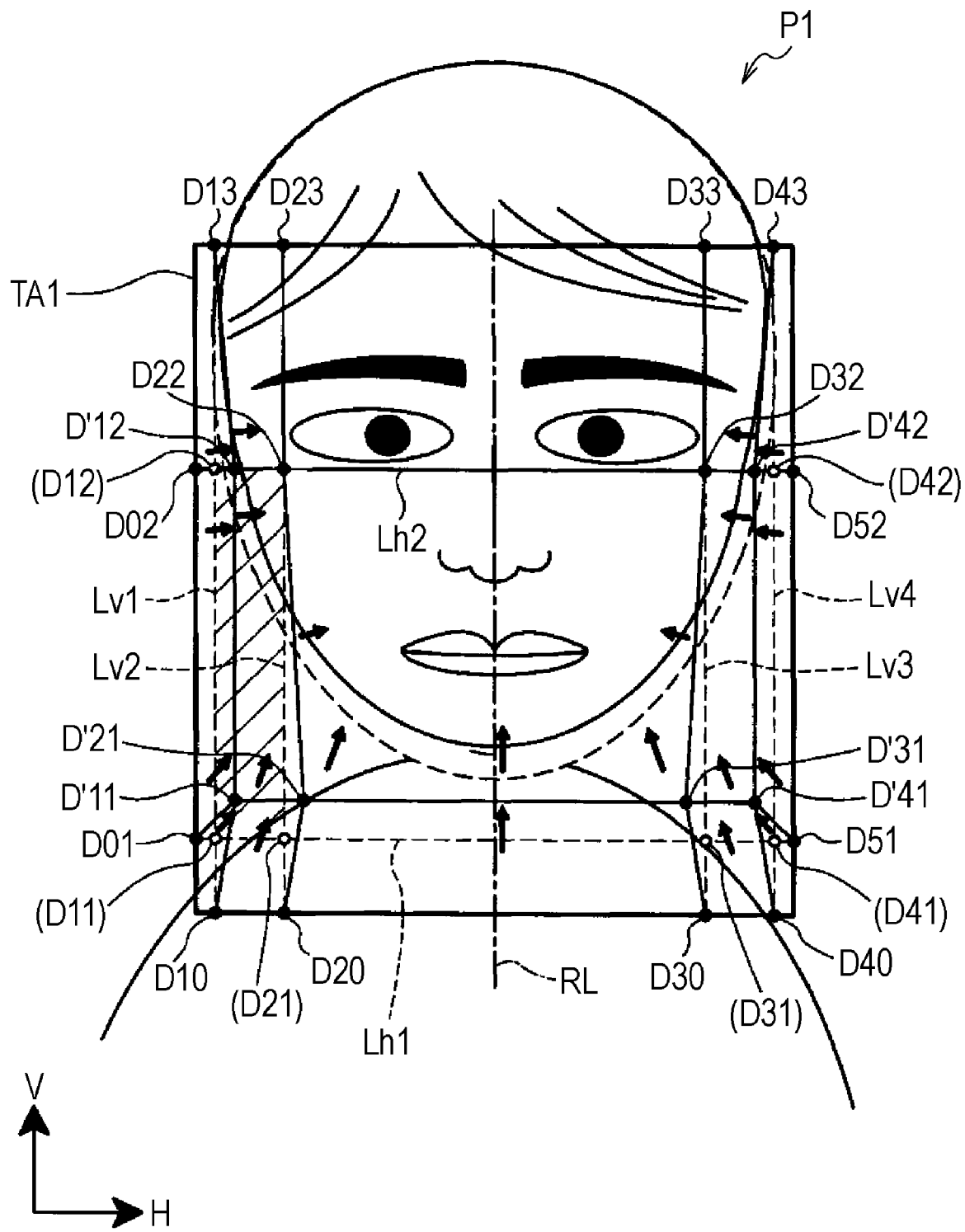
FIG. 16 is an explanatory diagram showing a detailed modified shape of the modification area for a face image for the front direction according to an embodiment of the invention.

FIG. 16 is an explanatory diagram showing an example of movement of the positions of the division points D according to the division point moving table 420. In the example shown in FIG. 16, a detailed form of the modification at the time when the modification area TA1 is modified by moving the positions of the division points D is shown. The image correcting section 250 performs the image modifying process for each small area that constitutes the modification area TA1 such that the image of each small area in a state before the positions of the division points D are moved becomes an image of a small area that is newly defined in accordance with the movement of the positions of the division points D. In FIG. 16, for the convenience of comparison, the contour of the person P1 before modification is denoted by a long dotted line. In addition, in FIG. 16, "'" is attached to the reference sign of each division point D after movement, and a parenthesis is attached to the reference sign of each division point D (white circle) before movement. For example, the image of a small area (hatched small area) having the division points D11, D21, D22, and D12 as its vertexes is modified into the image of a small area having the division points D'11, D'21, D22 and D'12 as its vertexes. This modification process for the small area image will be described later in detail.

As shown in FIG. 16, as a result of movement of the division points in S1020, for the direction (direction V) parallel to the reference line RL, the positions of the division points D (D11, D21, D31, and D41) disposed on the horizontal division line Lh1 are moved to the upper side, and the positions of the division points D (D12, D22, D32, and D42) disposed on the horizontal division line Lh2 are not moved. Accordingly, an image that is located between the horizontal division line Lh1 and the horizontal division line Lh2 is reduced in the direction V. As described above, the horizontal division line Lh1 is disposed to the lower side of the image of the chin, and the horizontal division line Lh2 is disposed near right below the image of the eye. Accordingly, in the face-shape correction according to this embodiment, an image of a portion of the face image that extends from the chin to below the eye is reduced in the direction V. As a result, the line of the chin in the image is moved to the upper side.

In addition, for the direction (direction H) perpendicular to the reference line RL, the positions of the division points D (D11 and D12) disposed on the vertical division line Lv1 are moved to the right side, and the positions of the division points D (D41 and D42) disposed on the vertical division line Lv4 are moved to the left side. In addition, of two division points D disposed on the vertical division line Lv2, the position of the division point D (D21) disposed on the horizontal division line Lh1 is moved to the right-side direction. In addition, of two division points D disposed on the vertical division line Lv3, the position of the division point D (D31) disposed on the horizontal division line Lh1 is moved to the left side. Accordingly, an image located to the left side of the vertical division line Lv1 is enlarged to the right side in the direction H, and an image located to the right side of the vertical division line Lv4 is enlarged to the left side. In addition, an image located between the vertical division line Lv1 and the vertical division line Lv2 is reduced in the direction H and is moved to the right side, and an image located between the vertical division line Lv3 and the vertical division line Lv4 is reduced in the direction H and is moved to the left side. In addition, an image located between the vertical division line Lv2 and the vertical division line Lv3 is reduced in the direction H with the position of the horizontal division line Lh1 used as the center.

As described above, the vertical division lines Lv1 and Lv4 are disposed to the outer side of the image of the line of the cheek, and the vertical division lines Lv2 and Lv3 are disposed to the outer side of the images of the tails of the eyes. Thus, according to this embodiment, the image of a portion located outside the two tails of the eyes of the face image is reduced in the direction H on the whole. In particular, the reduction ratio near the chin is increased. As a result, the shape of the face in the image becomes thinner in the width direction on the whole. To sum up the modification shapes for the direction H and the direction V, the shape of the face of the person P1 that is included in the modification area TA1 becomes thinner (smaller face) by performing the process of Step S1020. In the printer 100, the positions of the division points D (for example, the division point D10 shown in FIG. 16 and the like) that are located on the outer line of the modification area TA1 are configured not to be moved, so that the boundary between images inside and outside the modification area TA1 is not unnatural. Accordingly, in the division point moving table 420, the amounts of movement for the division points D located on the outer line of the modification area are not set.

FIG. 17 shows a case where the modification process of S1000 is performed for the modification area TA2 as a target that is set with the face area Fd2' used as the reference. Also for the modification area TA2, the image correction section 250, similar to the modification process for the modification area TA1, disposes the division points D by referring to the division point disposing pattern table 410 (S1010) and moves the positions of the division points D based on the division point moving table 420, and thereby modifying the small areas (S 1020). Also in FIG. 17, the contour of the person P2 before modification is denoted by a broken line, "'" is attached to the reference sign of each division point D after movement, and a parenthesis is attached to the reference sign of each division point D (white circle) before movement. As is apparent from FIG. 17, similar to the modification for the modification area TA1 of the person P1, the shape of the face becomes thinner (smaller face) in the modification area TA2 of the person P2.

Figure 18:
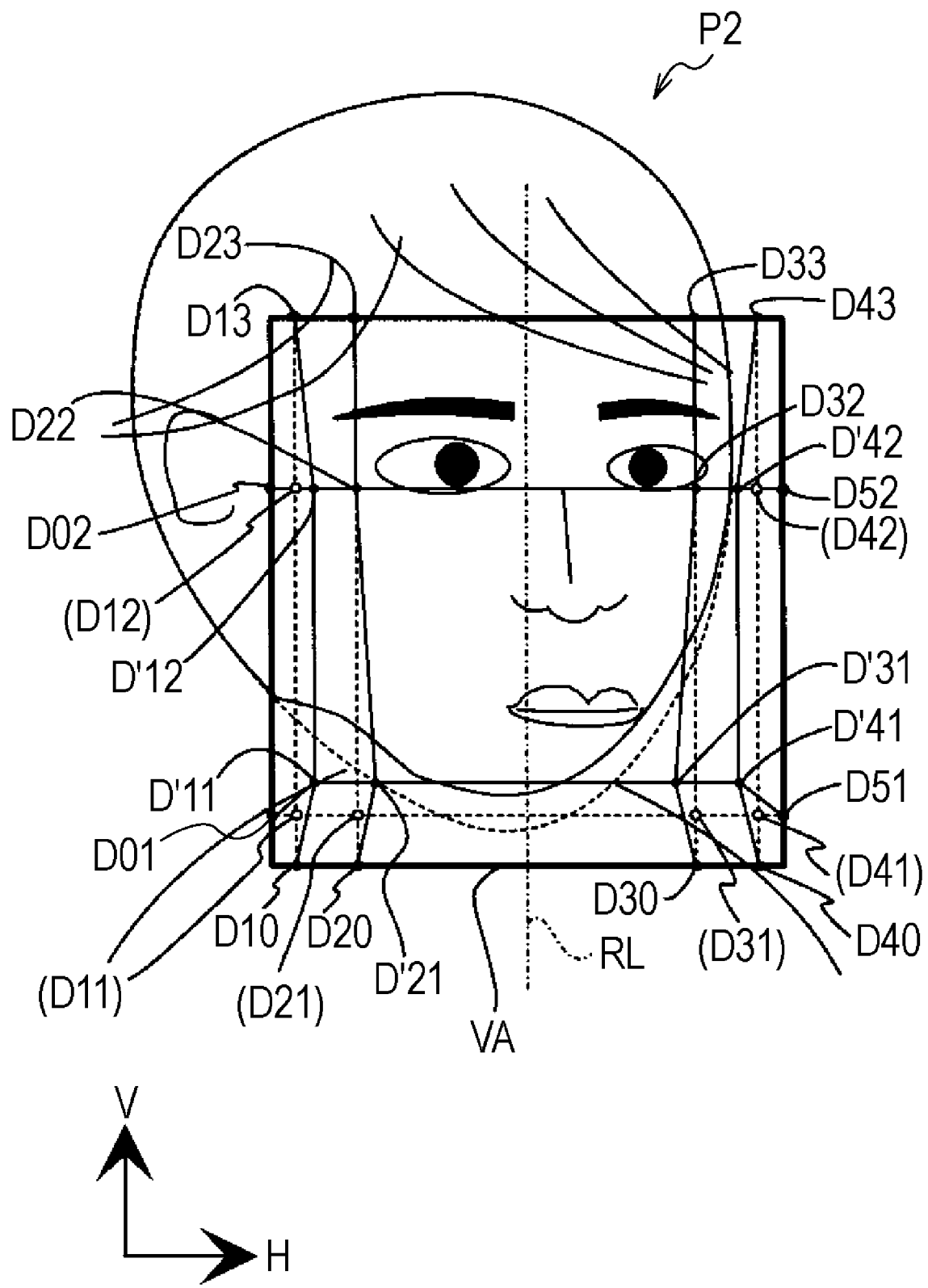
FIG. 18 is an explanatory diagram showing a detailed modified shape of a modification area for a face image turned to the right side in a case where the modification area is set with a face area that is not enlarged based on the direction of the face and the degree of turn of the face used as a reference.

FIG. 18 is a comparative example for FIG. 17 and shows a case where the modification process of S1000 is performed for the modification area VA as a target that is set with the face area Fd2 of the person P2 used as the reference. Also in FIG. 18, the contour of the person P2 before modification is denoted by a broken line, "'" is attached to the reference sign of each division point D after movement, and a parenthesis is attached to the reference sign of each division point D (white circle) before movement. As described above, the modification area VA is smaller than the modification area TA2 that is set with the face area Fd2' used as the reference and is located in a position in which the area of the face located on a side opposite to the face direction is not sufficiently included. Accordingly, when the direction of the face is the "direction turned to the right side", particularly the division points D11 and D21 of the division points D11, D21, D31, and D41 of which amounts of movement are large are disposed near the line of the chin of the face, compared to the examples shown in FIG. 17 or 16 (when the direction of the face is the "direction turned to the left side", the division points D3 1 and D41 are disposed near the line of the chin). As described above, when the division points D of which the amounts of movement is large at the time of the modification process is disposed near the line of the chin of the face image, as exemplified in FIG. 18, the line of the chin may form an unnatural curve in the face after modification. In addition, in some cases, an unnatural level difference may be generated in the line of the chin in the face after modification.

According to this embodiment, in order to prevent the disadvantages such as the unnatural line of the chin or the generation of the level difference, the above-described modification area TA2 is set as the target image TI for a turned-face image such as the person P2, and the small areas within the modification area TA2 are modified. As described above, the modification area TA2 is larger than the modification area VA and is located in a position in which almost all the areas of the face located on a side opposite to the face direction are included and the area below the chin is sufficiently included as well. Accordingly, the division points of the division points D such as D11, D21, D31, and D41, of which amounts of movement are large, are disposed in positions located sufficiently far from the line of the chin of the face (see FIG. 17). As a result, the above-described disadvantages that can occur in a case where the modification process is performed for the modification area VA (see FIG. 18) as a target can be avoided.

Figure 19:
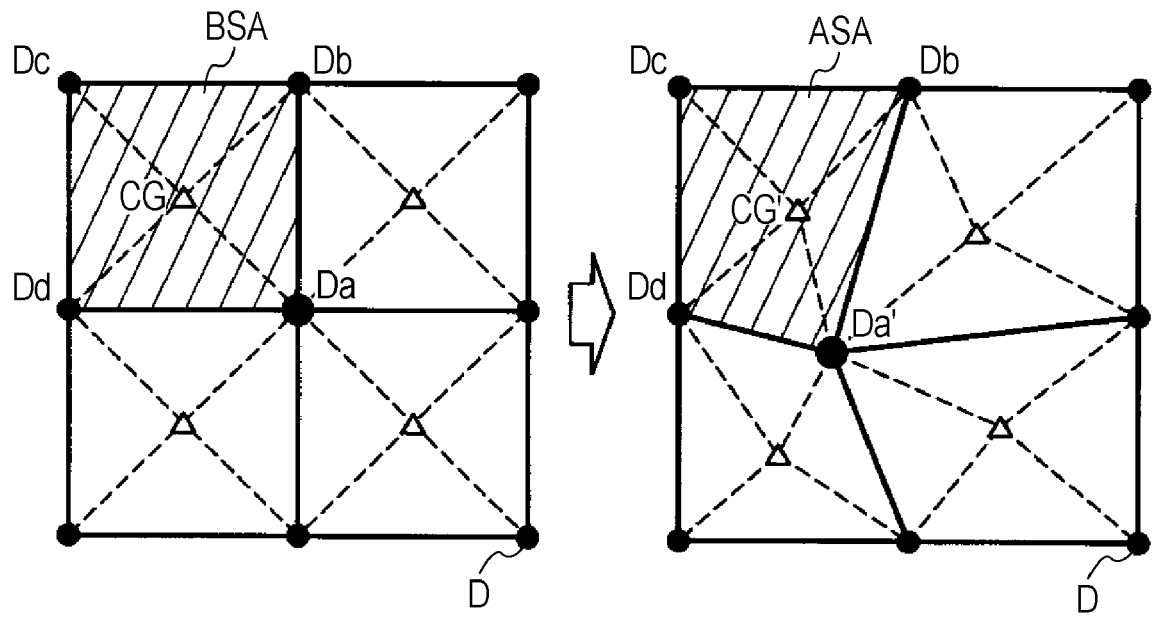
FIG. 19 is an explanatory diagram conceptually showing a modifying process for a small area image according to an embodiment of the invention.

FIG. 19 is an explanatory diagram conceptually showing the modification process for the image of the small area which is performed in S1020. In FIG. 19, the division points D are denoted by black circles. In addition, for the simplification of description, for four small areas, the state before movement of the positions of the division points D is shown on the left side, and the state after movement of the positions of the division points D is shown on the right side. In the example shown in FIG. 19, the division point Da located on the center is moved to the position of the division point Da', and the positions of the other division points D are not moved. Accordingly, for example, the image of a small area (hereinafter, also referred to as a "focused small area before modification BSA") of a rectangle having the division points Da, Db, Dc, and Dd before movement of the division points D as its vertexes is modified into an image (hereinafter, also referred to as a "focused small area after modification ASA") of small areas of a rectangular having the division points Da', Db, Dc, and Dd as its vertexes.

According to this embodiment, the small area having the rectangle shape is divided into four triangle areas by using the center CG of the small area, and the image modifying process is performed in units of the triangle areas. In the example shown in FIG. 19, the focused small area before modification BSA is divided into four triangle areas having the center CG of the focused small area before modification BSA as one vertex. Similarly, the focused small area after modification ASA is divided into four triangle areas having the center CG' of the focused small area after modification ASA as one vertex. Then, the image modifying process is performed for each triangle area corresponding to states before and after the movement of the division points Da. For example, the image of the triangle area having the division points Da and Dd and the center CG of the focused small area before modification BSA as its vertex is modified into the image of the triangle area having the division points Da' and Dd and the center CG' of the focused small area after modification ASA as its vertex.

Figure 20:
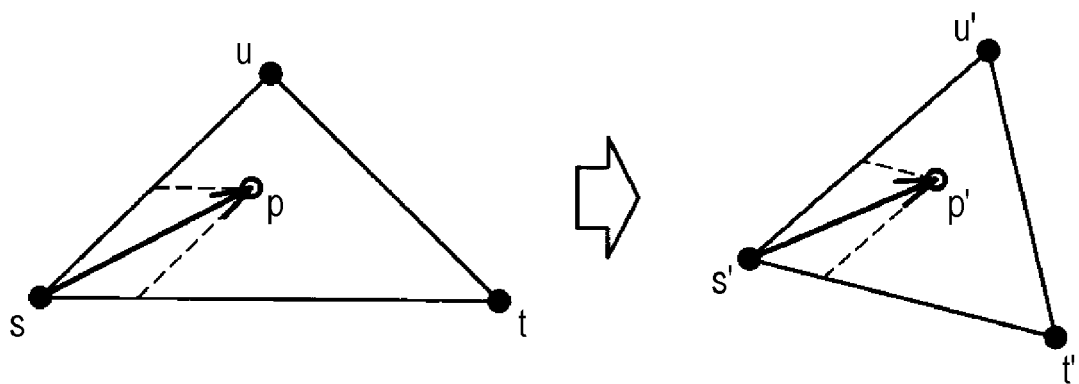
FIG. 20 is an explanatory diagram showing the concept of a method of an image modifying process for a triangle area according to an embodiment of the invention.

FIG. 20 is an explanatory diagram showing the concept of a method of an image modifying process for the triangle area. In the example shown in FIG. 20, the image of a triangle area stu having points s, t, and u as its vertexes is modified into the image of a triangle area s't'u' having points s', t', and u' as it vertexes. The modification of the image is performed by calculating the position of the triangle area stu before modification corresponding to the position of each pixel in the image of the triangle area s't'u' after modification and setting the pixel value of the image before modification in the calculated position to the pixel value of the image after modification.

For example, in FIG. 20, it is assumed that the position of the focused pixel p' in the image of the triangle area s't'u' after modification corresponds to a position p in the image of the triangle area stu before modification. The calculation of the position p is performed as below. First, coefficients m1 and m2 for representing the position of the focused pixel p' as a sum of a vector s't' and a vector s'u' as in the following Equation (1) are calculated.

[Equation 1]

$$\vec{s'p'} = m1 \cdot \vec{s't'} + m2 \cdot \vec{s'u'} \quad (1)$$

Next, the position p is acquired by calculating a sum of the vector st and the vector su in the triangle area stu before modification in accordance with the following Equation 2 by using the calculated coefficients m1 and m2.

[Equation 2]

$$\vec{sp} = m1 \cdot \vec{st} + m2 \cdot \vec{su} \quad (2)$$

When the position p in the triangle area stu before modification coincides with the center position of the pixel in the image before modification, the pixel value of the pixel is regarded as the pixel value of the image after modification. On the other hand, when the position p in the triangle area stu before modification is deviated from the center position of the pixel in the image before modification, the pixel value in the position p is calculated by performing an interpolation operation such as bicubic using pixel values of pixels adjacent to the position p, and the calculated pixel value is regarded as the pixel value of the image after modification.

By calculating the pixel value for each pixel in the image of the triangle area s't'u' after modification as described above, the image modifying process from the image of the triangle area stu to the image of the triangle area s't'u' can be performed. As described above, the area correcting section 250 performs the modification process for each small area constituting the modification area by defining triangle areas as described above.

3. Summing Up

As described above, according to this embodiment, the printer 100 estimates the direction of the face image (the direction turned to the right side or the direction turned to the left side) and the degree of turn of the face based on the ratio of the reference width Wr corresponding to a distance between the right eye area and the left eye area in the face area detected from the target image to the reference height Hr corresponding to a distance between a segment connecting the right eye area and the left eye area and the mouth area, the size relationship between the right eye area and the left eye area, or the like. When the face image is in a state being turned to the right side or being turned to the left side, the printer 100 changes the position and the size of the detected face area such that the face area is enlarged more toward a side opposite to the face direction as the degree of turn of the face is increased and sets the correction target area (modification area) by enlarging the face area after modification in accordance with a predetermined enlargement ratio (a predetermined coefficient for enlargement). Then, the modification is performed by applying a predetermined modification process for face miniaturization to the set correction target area.

Accordingly, modification for face miniaturization for a face image turned to a direction other than the front direction can be performed, which cannot be easily performed typically. In addition, it is possible to implement face miniaturization in a good shape by resolving formation of an unnatural line of the chin, the level difference, and the like that can occur as the result of face miniaturization for the face image turned to the side. In addition, according to the face shape correcting process of this embodiment, a difference between a process for a face image for the front direction and a process for a face image for the direction turned to the right side or the left side is whether a change (enlargement and movement) process corresponding to the degree of turn of the face and the direction of the face is added to the detected face area only. Thus, the method of setting the modification area and the content of the modification process for the set modification area are the same for the above-described processes. Accordingly, the processing amount needed for face shape correcting does not change markedly based on the difference of the face direction in the face image, and thereby the load of the printer 100 can be reduced.

In addition, the printer 100 does not store the information needed for the face shape correcting (for example, the above-described coefficients k1, k2, and k3 for setting the modification area, the division point disposing pattern table 410, or the division point moving table 420) separately for the modification process for the face image for the front direction and the modification process for the face image for the direction turned to the right side or the left side. Accordingly, the memory resources of the printer 100 can be saved.

What is claimed is:

1. An image processing apparatus comprising:
   a face direction estimating unit that estimates the direction and the degree of turn of a face with the front direction of the face included in a face image used as a reference for a target image that includes the face image; and
   an area setting unit that changes a first area based on the direction and the degree of turn of the face and sets a correction target area with the changed first area used as a reference when an area that includes the first area is set as the correction target area with the first area that includes predetermined facial organs of the face image used as a reference, wherein the area setting unit sets the correction target area by enlarging the first area, which is used as the reference, with a predetermined enlargement ratio.

2. The image processing apparatus according to claim 1, wherein the area setting unit enlarges the first area more toward a side opposite to the direction of the face as the degree of turn of the face is increased.

3. The image processing apparatus according to claim 2, wherein the face direction estimating unit estimates the degree of turn of the face based on a distance between the facial organs, and wherein the area setting unit determines the degree of enlargement for the first area based on the distance between the facial organs.

4. The image processing apparatus according to claim 1, wherein the area setting unit acquires an area that includes the facial organs detected by a detection unit, which can detect an area including the facial organs from the target image, as the first area, wherein, when the degree of turn of the face is larger than a predetermined value, the area setting unit changes the acquired first area based on the direction and the degree of turn of the face, and wherein, when the degree of turn of the face is equal to or smaller than the predetermined value, the area setting unit sets the correction target area with the acquired first area used as a reference.

5. The image processing apparatus according to claim 4, further comprising an image correcting unit that modifies an image within the correction target area by disposing a plurality of division points in the set correction target area, dividing the correction target area into a plurality of small areas by using straight lines connecting the division points, and modifying the small areas by moving the position of at least one of the division points.

6. A method for image processing using a computer comprising:

estimating the direction and the degree of turn of a face with the front direction of the face included in a face image used as a reference for a target image that includes the face image; and changing a first area based on the direction and the degree of turn of the face and sets a correction target area with the changed first area used as a reference when an area that includes the first area is set as the correction target area with the first area that includes predetermined facial organs of the face image used as a reference, wherein the correction target area is set by enlarging the first area, which is used as the reference, with a predetermined enlargement ratio.

7. A computer program product for processing an image comprising:

a non-transitory computer readable program medium; and a computer program stored on the non-transitory computer readable medium, the computer program including;

a program for causing a computer to estimate the direction and the degree of turn of a face with the front direction of the face included in a face image used as a reference for a target image that includes the face image; and a program for causing a computer to change a first area based on the direction and the degree of turn of the face and sets a correction target area with the changed first area used as a reference when an area that includes the first area is set as the correction target area with the first area that includes predetermined facial organs of the face image used as a reference, wherein the correction target area is set by enlarging the first area, which is used as the reference, with a predetermined enlargement ratio.

* * * * *